United States Patent [19]

Bond

[11] 4,108,230

[45] Aug. 22, 1978

[54] TIRE STUDS

[75] Inventor: Robert Bond, Lichfield, England

[73] Assignee: Dunlop Limited, England

[21] Appl. No.: 700,526

[22] Filed: Jun. 28, 1976

[30] Foreign Application Priority Data

Jul. 5, 1975 [GB] United Kingdom ............... 28455/75

[51] Int. Cl.$^2$ ............................................. B60C 11/14
[52] U.S. Cl. .................................................... 152/210
[58] Field of Search ........................................ 152/210

[56] References Cited

U.S. PATENT DOCUMENTS

| | | | |
|---|---|---|---|
| 3,196,921 | 7/1965 | Hakka | 152/210 |
| 3,545,515 | 12/1970 | Gottauf | 152/210 |
| 3,837,386 | 9/1974 | Lejeune | 152/210 |
| 3,987,831 | 10/1976 | Walrave | 152/210 |

FOREIGN PATENT DOCUMENTS

| | | | |
|---|---|---|---|
| 1,505,186 | 5/1969 | Fed. Rep. of Germany | 152/210 |
| 2,404,463 | 1/1974 | Fed. Rep. of Germany | 152/210 |

Primary Examiner—Drayton E. Hoffman
Assistant Examiner—Carl Rowold
Attorney, Agent, or Firm—Stevens, Davis, Miller & Mosher

[57] ABSTRACT

A tire stud comprises a cylindrical body portion having embedded in one end and protruding therefrom a cylindrical tip of hard wearing material for engaging a road surface. The stud is designed to reduce road surface damage without significantly affecting the grip of the stud on the road surface.

1 Claim, 1 Drawing Figure

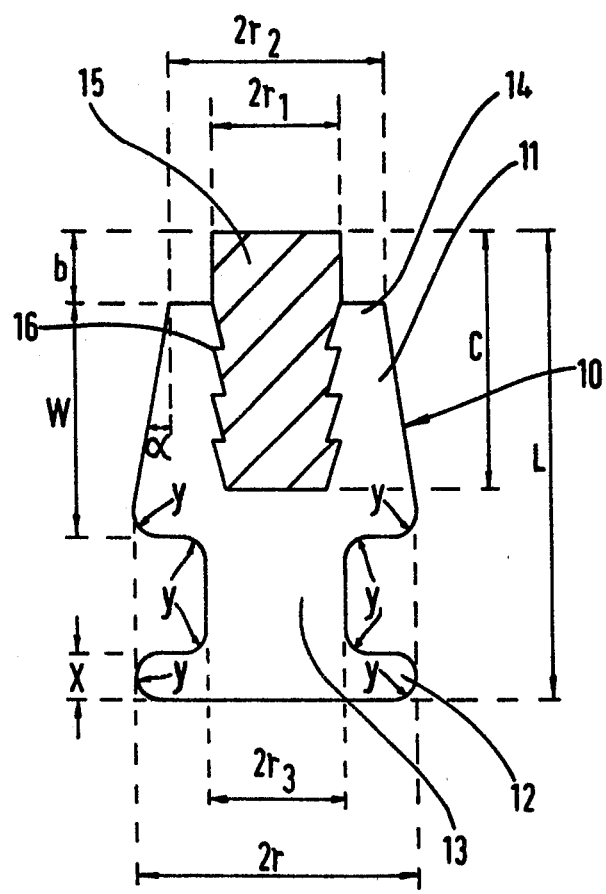

TIRE STUDS

This invention relates to tire studs and in particular, though not exclusively, to tire studs which are suitable for use with a car tire.

Hitherto known and used studs fitted to tires have been successful in providing tires having an improved grip on ice and snow covered surfaces and have resulted in little loss of grip of the tyre when operating on road surfaces free of ice or snow. The use of studs does, however, have the disadvantage of tending to cause considerable road surface damage when operating on a surface which is free of ice or snow and thus they cannot therefore be considered entirely satisfactory.

Investigations have previously been made to determine the parameters affecting road surface damage and these have been found to include not only features of the stud per se but also features of the stud tires assembly such as the distance between the base of a stud and a tire reinforcement carcass. Known studded tires in which optimization of these parameters either individually or together to reduce road surface damage without significantly affecting the grip provided have not however been particularly successful.

A particularly desirable shape of tire stud comprises a substantially cylindrical shape body portion having embedded in one end thereof and protruding therefrom a substantially cylindrical shape tip of a hard wearing material for engaging a road surface.

Accordingly the present invention provides a tire stud in which the overall length L of the stud, radius $r$ of the stud body, protrusion $b$ of the tip, and radius $r_1$ of the tip are related such that the expression $$\frac{a_1(a_2 + a_3)a_4}{(a_5 + a_6 + a_7)}$$

lies between the limits $3.3 \times 10^5$ and $8.2 \times 10^5$ where:

$$a_1 = \frac{31.831}{(r_1)^2}$$

$$a_2 = 67468.8r$$

$$a_3 = \frac{0.0705221r}{(b + 0.00043)^2}$$

$$a_4 = (7000.0b + 3.0)r^2$$

$$a_5 = 21476.0r(0.015 + b - L)$$

$$a_6 = 7560117.0r^2(b + 0.00043)$$

$$a_7 = \frac{0.02245r(0.015 + b - L)}{(b + 0.00043)^2}$$

Preferably the tire stud has an overall length L of 0.010 meter ± 0.0005 meter, the base diameter $2r$ of the stud 0.0055 meter ± 0.0005 meter, the tip diameter $2r_1$ of the stud is 3 mm ± 0.2 mm, and the protrusion $b$ of the tip is 0.00125 meter ± 0.00025 meter.

In a preferred embodiment of the invention a stud is constructed substantially as illustrated in the accompanying drawing which is a sectional elevation of a stud in accordance with the present invention, the stud comprising a body 10 of metal alloy material comprising a tubular portion 11 and base portion 12 interconnected by a neck portion 13 formed integrally with the tubular and base portions. Embedded in the tubular portion 11 and protruding from one end 14 thereof is a road surface engaging tip 15 of tungsten carbide material, the tip being formed along its length with a series of circumferentially extending projections 16 so as to have a sawtooth profile in cross-section and assist in retention of the tip within the tubular body portion 11. The tubular body portion is tapered along its length and the included angle $2\alpha$ of the frusto-conical shaped surface of this portion is 20°, with the embedded tip projecting from the narrower end of the tubular portion 11. The wider end of the tubular portion, in the region of the neck portion 13, has a diameter substantially equal to that of the base portion 12 so as to define around the neck portion 13 an annular cavity of a shape which assists tread rubber urged therein upon insertion of the stud into a tire tread to provide a good grip to both resist dislodging of the stud from the tire tread and inward movement of the stud into the tire tread, in the manner described in the specification of the Assignee's co-pending U.S. application Ser. No. 686,407 filed May 14, 1976, now abandoned. The body material between the tubular neck and retaining portions is curved on a radius $y$ to avoid sharp edges which would otherwise tend to cause tearing of the tread material when the stud is fitted.

As a result of theoretical and experimental considerations it is beleived that the overall length L of the stud should be 0.010 meter ± 0.0005 meter, the base diameter $2r$ of the stud should be 0.0055 meter ± 0.0005 meter, the tip diameter $2r_1$ should be 0.003 meter ± 0.0002 meter, and the protrusion $b$ of the tip from the end 14 of the tubular body portion 11 should be 0.00125 meter ± 0.00025 meter.

To further assist in providing a stud which is shaped and dimensioned to give a good grip on snow or ice without undue road surface damage other dimensions of the stud are preferably such that the length $c$ of the tip is 0.00525 meter ± 0.00025 meter, length $w$ of the tubular body portion 11 0.005 meter ± 0.0005 meter, diameter $2r_2$ at the narrower end of the tubular portion 11 0.0045 meter ± 0.0005 meter, and diameter $2r_3$ of the neck portion 0.0055 meter ± 0.005 meter.

Within the above limits it is believed that particular benefits are obtained if L = 0.010 meter, $b$ = 0.010 meter, $c$ = 0.0053, $w$ = 0.005 meter, $2r$ = 0.006 meter, $2r_1$ = 0.003 meter, $2r_2$ = 0.0045 meter, $2r_3$ = 6 mm. 0.006 meter. While it is preferred that the angle $\alpha$ of the taper of the frusto-conical surface of the body portion is 10°, the present invention provides a stud as hereinbefore defined in which said angle lies in the range 5° to 15°.

A stud of the above described shape and dimensions is particularly suitable for use in the tread of a tire sized 165-14, the tire having a radial ply reinforcement of either 4 textile breaker plies of 2 steel breaker plies with a tread thickness of 0.015 between the tread surface and radially outer breaker surface, considered at the center of the tread between the edges thereof.

The above described stud is believed to be particularly beneficial in providing a good grip in ice or snow conditions without causing undue road surface damage if parameters of the tire in which it is embedded are as follows:

Tire section breaker radius: 0.368 meter
Tire section sidewall radius: 0.064 meter
Circumferential tire breaker radius: 0.320 meter
Number of textile breakers: 4
Number of ends / 0.10 meter in breaker fabric: 75
Radius of breaker cord: 0.00038 meter Modulus of breaker cord: $4.5 \times 10^8$ kg/m²
Bias angle of breaker cords: 20°
Tire inflation pressure: 2.0 kg/cm²

As specified above the stud should have an overall length L of not less than 0.0005 meter; if the overall length of the stud is less than this it is considered that it will not provide an effective grip on snow or ice covered surfaces.

While the above described tire stud comprises a tungsten carbide tip embedded in a metal alloy body, the body may alternatively be made of a plastics material which is sufficiently hard and has a high melting point so as to provide good location for the tungsten carbide tip without becoming unduly hot and soft as a result of forces acting on the stud materials.

Studs in accordance with the present invention are particularly suitable for distributing over the surface of a tire tread in a manner defined in the specification of the Assignee's co-pending U.S. application Ser. No. 641,436 filed Dec. 17, 1975, or in the specification of the Assignee's copending U.S. application Ser. No. 686,273 filed May 14, 1976.

It will be appreciated from the foregoing that a stud in accordance with the present invention is particularly suitable for use in a car tire, and that the present invention also provides an assembly of a stud in accordance with the invention located in the tread of a car tire.

Having now described my invention what I claim is:

1. A tire stud having a body of circular cross-section with a maximum radius $r$ of 0.00275 meter ± 0.0005 meter, said body having a tip portion embedded in one end of said body and protruding above said body by a distance $b$ of 0.00125 meter ± 0.00025 meter, said tip portion having a circular cross-section with a radius $r_1$ of 0.0015 meter ± 0.0002 meter, said stud having an overall length L of 0.010 meter ± 0.0005 meter, and being dimensioned such that the expression $$\frac{a_1(a_2 + a_3)a_4}{(a_5 + a_6 + a_7)}$$

lies between the limits $3.3 \times 10^5$ and $8.2 \times 10^5$ where:

$$a_1 = \frac{31.831}{(r_1)^2}$$

$$a_2 = 67468.8r$$

$$a_3 = \frac{0.0705221r}{(b + 0.00043)^2}$$

$$a_4 = (7000.0b + 3.0)r^2$$

$$a_5 = 21476.0r(0.015 + b - L)$$

$$a_6 = 7560117.0r^2(b + 0.00043)$$

$$a_7 = \frac{0.02245r(0.015 + b - L)}{(b + 0.00043)^2}$$

* * * * *